US007728908B2

(12) United States Patent
Tokutomi (10) Patent No.: US 7,728,908 B2
(45) Date of Patent: Jun. 1, 2010

(54) PULL-DOWN SIGNAL DETECTING APPARATUS, PULL-DOWN SIGNAL DETECTING METHOD, AND INTERLACE-PROGRESSIVE CONVERTER

(75) Inventor: Hideaki Tokutomi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/393,939

(22) Filed: Feb. 26, 2009

(65) Prior Publication Data

US 2009/0322886 A1 Dec. 31, 2009

(30) Foreign Application Priority Data

Jun. 27, 2008 (JP) ............... 2008-169080

(51) Int. Cl.
H04N 3/36 (2006.01)
H04N 9/11 (2006.01)
H04N 9/64 (2006.01)
H04N 7/01 (2006.01)
H04N 11/20 (2006.01)
H04N 5/46 (2006.01)

(52) U.S. Cl. .................. 348/441; 348/97; 348/448; 348/452; 348/701

(58) Field of Classification Search .............. 348/97, 348/448, 452, 558, 700–701
See application file for complete search history.

(56) References Cited

U.S. PATENT DOCUMENTS 5,852,473 A 12/1998 Horne et al.
6,509,933 B1 * 1/2003 Honda ................ 348/558
7,142,246 B2 * 11/2006 Chen et al. ................ 348/448
7,499,102 B2 * 3/2009 Lee et al. .................. 348/441
2002/0023235 A1 2/2002 Odahhara
2002/0101924 A1 * 8/2002 Suzuki et al. ............ 375/240.2

(Continued)

FOREIGN PATENT DOCUMENTS

JP B2-4253327 9/1992

(Continued)

OTHER PUBLICATIONS

Japanese Patent Application No. 2008-143508, Notice of Reason for Rejection, mailed Apr. 14, 2009. (English translation).

*Primary Examiner*—Brian P Yenke
(74) *Attorney, Agent, or Firm*—Blakely, Sokoloff, Taylor & Zafman LLP (57) ABSTRACT

According to the invention, a pull-down signal detecting apparatus includes: an interfield motion detecting module configured to determine whether or not an interfield motion between a first field signal and a second field signal exists by comparing a first counted number with a first threshold; an interframe motion determining module configured to determine whether or not an interframe motion between the first field signal and a third field signal exists by comparing a second counted number with a second threshold; a determination module configured to determine whether or not the video signal is pull-down signal based on the determination result of the interfield motion determining module and the interframe motion determining module; and a threshold control module configured to vary the first threshold, when the determination result of the interframe motion determining module corresponds with a second pull-down pattern and when the determination result of the interfield motion determining module does not correspond to a first pull-down pattern.

9 Claims, 8 Drawing Sheets

U.S. PATENT DOCUMENTS

| | | | |
|---|---|---|---|
| 2003/0202587 A1* | 10/2003 | Suzuki et al. | 375/240.12 |
| 2003/0223497 A1* | 12/2003 | Suzuki et al. | 375/240.21 |
| 2004/0135924 A1* | 7/2004 | Conklin | 348/448 |
| 2005/0018087 A1 | 1/2005 | Lee | |
| 2005/0078213 A1* | 4/2005 | Sumiyoshi et al. | 348/441 |
| 2006/0012707 A1 | 1/2006 | Chow | |
| 2006/0187301 A1 | 8/2006 | Fuji | |
| 2007/0024703 A1* | 2/2007 | Conklin | 348/97 |
| 2007/0222895 A1 | 9/2007 | Yamauchi | |
| 2007/0252894 A1* | 11/2007 | Satou et al. | 348/97 |
| 2007/0273789 A1* | 11/2007 | Tokutomi et al. | 348/449 |
| 2007/0279532 A1* | 12/2007 | Yamauchi | 348/701 |
| 2008/0062307 A1* | 3/2008 | Zhai et al. | 348/448 |
| 2008/0062308 A1* | 3/2008 | Zhai et al. | 348/448 |
| 2008/0068497 A1* | 3/2008 | Lee et al. | 348/448 |
| 2008/0100745 A1* | 5/2008 | Matsubara | 348/458 |
| 2008/0118223 A1 | 5/2008 | Kamiwada et al. | |
| 2008/0122973 A1* | 5/2008 | Iwasaki et al. | 348/448 |
| 2008/0151103 A1* | 6/2008 | Asamura et al. | 348/448 |
| 2008/0158416 A1* | 7/2008 | Lu | 348/452 |
| 2008/0186406 A1* | 8/2008 | Chao | 348/700 |
| 2008/0218630 A1* | 9/2008 | Kempf et al. | 348/452 |
| 2009/0115845 A1* | 5/2009 | Walls et al. | 348/135 |
| 2009/0153442 A1* | 6/2009 | Kimura et al. | 345/63 |
| 2009/0195691 A1* | 8/2009 | Wyman | 348/452 |
| 2009/0256958 A1* | 10/2009 | Chao | 348/452 |

FOREIGN PATENT DOCUMENTS

| | | |
|---|---|---|
| JP | 11-299092 | 10/1999 |
| JP | 2000-112579 | 4/2000 |
| JP | 2002-062952 | 2/2002 |
| JP | 2002-330408 | 11/2002 |
| JP | 2003-189260 | 7/2003 |
| JP | 2005-079872 | 3/2005 |
| JP | 2006-20119 | 1/2006 |
| JP | 2006-237695 | 9/2006 |
| JP | 2006-339912 | 12/2006 |
| JP | B2-3916637 | 5/2007 |
| JP | 2007-274411 | 10/2007 |
| JP | 2008-118223 | 5/2008 |

* cited by examiner

PULL-DOWN SIGNAL DETECTING APPARATUS, PULL-DOWN SIGNAL DETECTING METHOD, AND INTERLACE-PROGRESSIVE CONVERTER

CROSS-REFERENCE TO RELATED APPLICATIONS

This application is based upon and claims the benefit of priority from Japanese Patent Application No. 2008-169080, filed Jun. 27, 2008, the entire contents of which are incorporated herein by reference.

BACKGROUND

1. Field

The present invention relates to a pull-down signal detecting apparatus for detecting a pull-down signal generated from, for example, a cine film, and a pull-down signal detecting method. In addition, the invention relates to an improvement of an interlace-progressive converter using the pull-down signal detecting apparatus.

2. Description of the Related Art

As is generally known, currently, in a video signal of an NTSC (national television system committee) method, a PAL (phase alternation by line color television) method, or the like generally used as a standard television broadcasting method, video is scanned in a so-called interlaced scanning method that a 1-frame video signal is generated in two fields.

In recent, a thin-sized and large-screen television broadcasting receiver using a liquid crystal display and a plasma display has come into wide use. However, when an interlaced scanning video signal is displayed as it is in each scanning line using such a display, brightness of picture decreases and thus invisible video is displayed.

For this reason, in such a display, the interlaced scanning video signal is converted into a progressive scanning video signal and the converted signal is displayed. That is, in such a kind of displays, it is necessary to perform a progressive scanning converting process to convert the interlaced scanning video signal into the progressive scanning video signal.

The video signal based on the video signal the standard television method may include a video signal generated on the basis of the video of the cine film. In this case, since the number of frames at every second in the cine film and the number of frames (the number of fields) at every second in the video signal based on the standard method are set individually, generally, they do not coincide with each other.

For this reason, the video of the cine film is converted into a video signal based on the standard television method according to the interlace scanning, by using a 2-2 pull-down method, 2-3 pull-down method, or the like. The interlaced scanning video signal generated from the cine film as described above is called as a pull-down signal.

However, in the aforementioned progressive scanning converting process, it is possible to improve video quality by changing the method of the conversion process into the progressive scanning method, according to whether or not the input video signal is pull-down signal. Accordingly, it is important to accurately detect whether or not the input video signal is the pull-down signal, at the time of performing the progressive scanning converting process.

In JP-A-2002-330408, there is disclosed a technique that a integration result of difference before and after one field of the present field is determined in the whole fields by a threshold level varied by a level of an APL detector for detecting an average brightness level of an input video signal, and determination of a telecine conversion signal is performed on the basis of the field determination result of the five fields.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a pull-down signal detecting apparatus including: an interfield motion detecting module configured: to acquire a first field signal and a second field signal sequentially to the first field signal from video signal, the first field signal having a plurality of first blocks, the second field signal having a plurality of second blocks corresponding to the first blocks; to calculate interfield correlation values between the first blocks and the second blocks; to count a number of the interfield correlation values equal to or more than a given interfield correlation value as a first counted number; and to determine whether or not an interfield motion between the first field signal and the second field signal exists by comparing the first counted number with a first threshold;

an interframe motion determining module configured: to acquire the first field signal and a third field signal sequentially to the second field signal from the video signal, the third field signal having a plurality of third blocks corresponding to the first blocks; to calculate interframe correlation values between the first blocks and the third blocks; to count a number of the interframe correlation values equal to or more than a given interframe correlation value as a second counted number; and to determine whether or not an interframe motion between the first field signal and the third field signal exists by comparing the second counted number with a second threshold; a determination module configured to determine whether or not the video signal is pull-down signal based on the determination result of the interfield motion determining module and the determination result of the interframe motion determining module; and a threshold control module configured to vary the first threshold to correct an interfield difference between the first field signal and the second field signal which is caused by a difference of a vertical phase therebetween, when the determination result of the interframe motion determining module corresponds with a second pull-down pattern and when the determination result of the interfield motion determining module does not correspond to a first pull-down pattern.

Figure 1:
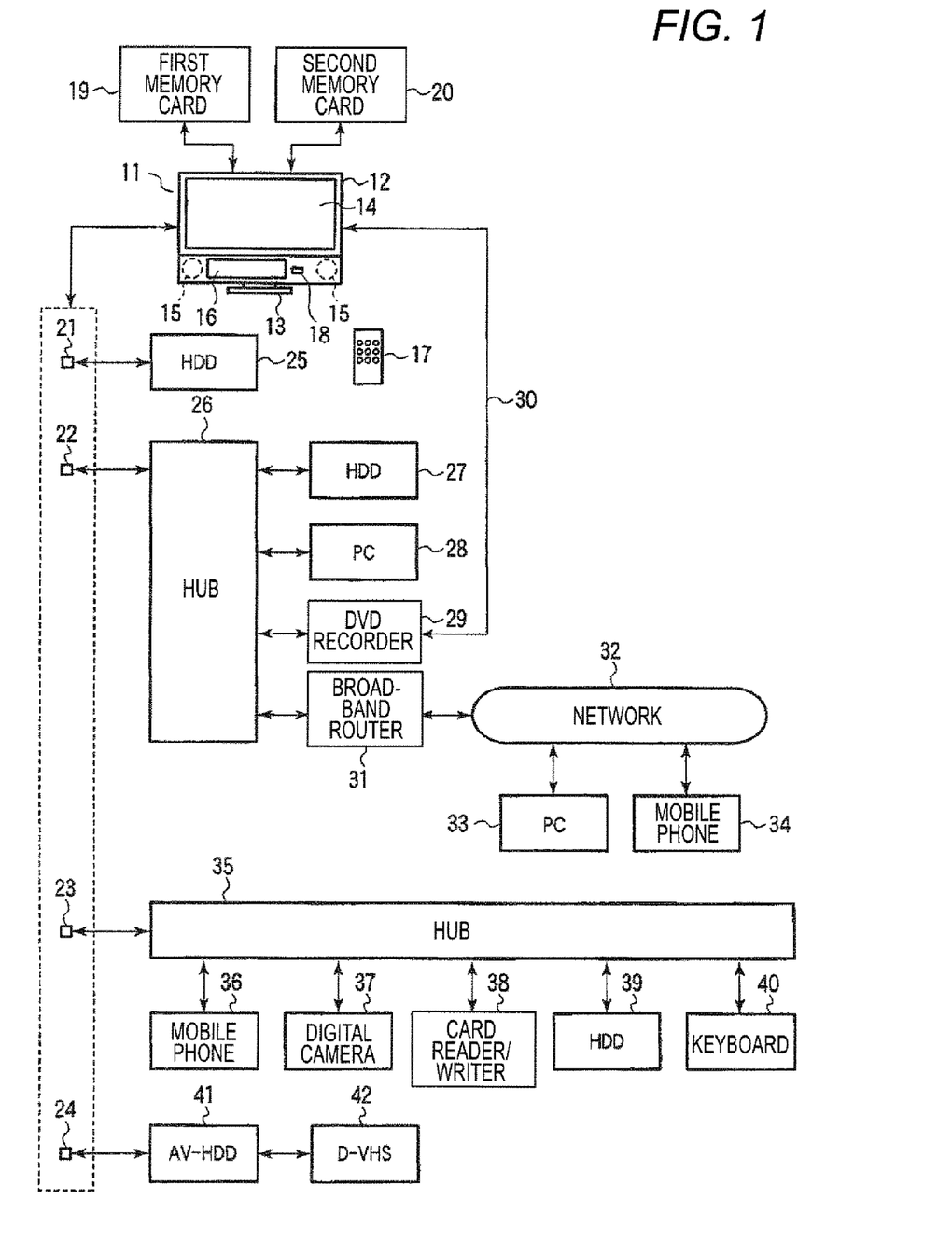
FIG. 1 is an exemplary schematic diagram illustrating an example of a digital television broadcasting receiver and a network system based thereon, according to an embodiment of the invention.

Hereinafter, an embodiment of the invention will be described in detail with reference to the drawings. FIG. 1 shows an example of appearance of a digital television broadcasting receiver 11 according to the embodiment and a network system based on the digital television broadcasting receiver 11.

That is, the digital television broadcasting receiver 11 mainly includes a thin cabinet 12 and a support base 13 for erecting and supporting the cabinet 12. The cabinet 12 is provided with, for example, a video flat panel display 14 formed of an SED (surface-conduction electron-emitter display) display panel or a liquid crystal display panel, a pair of speakers 15 and 15, an operation unit 16, a light reception unit 18 for receiving operation information transmitted from a remote controller 17, and the like.

The digital television broadcasting receiver 11 is detachably provided with a first memory card 19 such as an SD (secure digital) memory card, an MMC (multimedia card), and a memory stick, and performs a recording and reproducing process of a program or information such as pictures on the first memory card 19.

The digital television broadcasting receiver 11 detachably provided with a second memory card (IC (integrated circuit) card, etc.) 20, for example, on which contract information is recorded, and performs a recording and reproducing process of information on the second memory card 20.

The digital television broadcasting receiver 11 has a first LAN (local area network) terminal 21, a second LAN terminal 22, a USB (universal serial bus) terminal 23, and an IEEE (institute of electrical and electronics engineers) 1394 terminal 24.

The first LAN terminal 21 is used as a port only for a LAN corresponding HDD (hard disk drive). That is, the first LAN terminal 21 is used to record and reproduce information by Ethernet (trade mark) on a LAN corresponding HDD 25 that is a NAS (network attached storage) connected thereto.

As described above, since the digital television broadcasting receiver 11 is provided with the first LAN terminal 21 as the port only for LAN corresponding HDD, it is possible to stably record and reproduce information of a broadcasting program with hi-vision quality on the HDD 25, without effect of the other network environment, network using circumference, or the like.

The second LAN terminal 22 is used as a general LAN corresponding port using Ethernet (trademark). That is, the second LAN terminal 22 is connected to a LAN corresponding HDD 27, a PC (personal computer) 28, a HDD built-in DVD (digital versatile disk) recorder 29, and the like through a hub 26, and is used to perform information transmission with these devices by constructing, for example, a home network.

In this case, for the PC 28 and the DVD recorder 29, the second LAN terminal 22 has a function for operating as a server device of contents in the home network, and is configured as a UPnP (universal plug and play) corresponding device having a service for providing URI (uniform resource identifier) information necessary for access of contents.

In addition, for the DVD recorder 29, the second LAN terminal 22 is provided with an exclusive analog transmission path 30 to communicate analog video and audio information with the digital television broadcasting receiver 11, since digital information communicating through the LAN terminal 22 is information of only control system.

The second LAN terminal 22 is connected to an external network 32 such as internet through a broadband router 31 connected to the hub 26. The second LAN terminal 22 is used to communicate information with a PC 33 or a mobile phone 34 through the network 32.

The USB terminal 23 is used as a general USB corresponding port, is connected to USB devices such as a mobile phone 36, a digital camera 37, a card reader/writer 38 for a memory card, a HDD 39, a keyboard 40, and the like through the a hub 35, and is used to communicate information with these USB devices.

The IEEE 1394 terminal 24 is serially connected to a plurality of information recording and reproducing devices such as an AV-HDD 41 and D(digital)-VHS(video home system) 42 and is used to selectively communicate information with the devices.

Figure 2:
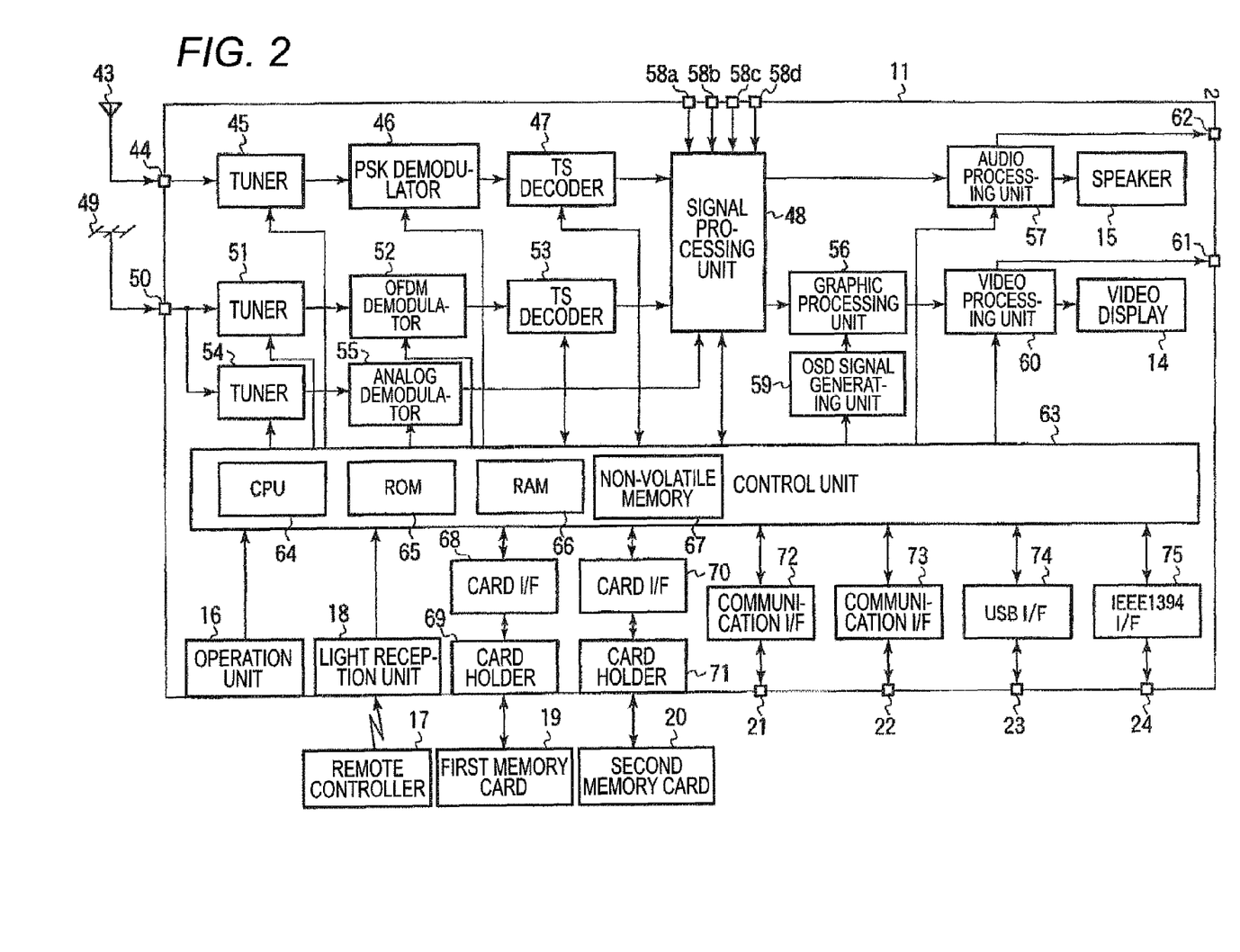
FIG. 2 is an exemplary block diagram illustrating a main signal processing system of the digital television broadcasting receiver according to the embodiment.

FIG. 2 shows a main signal processing system of the digital television broadcasting receiver 11. That is, a satellite digital television broadcasting signal received from a BS/CS (broadcasting satellite/communication satellite) digital broadcasting receiving antenna 43 for is supplied to a satellite digital broadcasting tuner 45 through an input terminal 44, thereby tuning a broadcasting signal of a desired channel.

The broadcasting signal tuned by the tuner 45 is sequentially supplied to a PSK (phase shift keying) demodulator 46 and a TS (transport stream) decoder 47 and is demodulated into a digital video signal and audio signal, and then the demodulated signals are output to a signal processing unit 48.

A terrestrial digital television broadcasting signal received by a terrestrial broadcasting receiving antenna 49 is supplied to a terrestrial digital broadcasting tuner 51 through an input terminal 50, thereby tuning a broadcasting signal of a desired channel.

The broadcasting signal tuned by the tuner 51 is sequentially supplied to an OFDM (orthogonal frequency division multiplexing) demodulator 52 and a TS decoder 53, for example, in Japan and is demodulated into a digital video signal and audio signal, and the demodulated signals are output to the signal processing unit 48.

A terrestrial digital analog television broadcasting signal received by the terrestrial broadcasting receiving antenna 49 is supplied to a terrestrial analog broadcasting tuner 54 through the input terminal 50, thereby tuning a broadcasting signal of a desired channel. The broadcasting signal tuned by the tuner 54 is supplied to an analog demodulator 55 and is demodulated into an analog video signal and audio signal, and the demodulated signals are output to the signal processing unit 48.

The signal processing unit 48 performs a predetermined digital signal process including, for example, a progressive scanning converting process and the like on the digital video signal supplied from each of the TS decoders 47 and 53, and performs a predetermined digital signal process on the digital audio signal supplied from each of the TS decoders 47 and 53. Then, the signal processing unit 48 outputs the processed signals to a graphic processing unit 56 and an audio processing unit 57.

The signal processing unit 48 is connected to a plurality (four in the figure) of input terminals 58a, 58b, 58c, and 58d. The input terminals 58a to 58d are provided to input analog video signals and audio signals from the outside of the digital television broadcasting receiver 11.

The signal processing unit 48 digitalizes the analog audio signals and audio signals supplied from the analog demodulator 55 and the input terminals 58a to 58d, the signal processing unit 48 performs a predetermined digital signal process including, for example, a progressive scanning converting process and the like on the digitalized video signals, the signal processing unit 48 performs a predetermined digital signal process on the digitalized audio signals, and the signal processing unit 48 outputs the processed signals to the graphic processing unit 56 and the audio processing unit 57.

The graphic processing unit 56 has a function of overlapping an OSD (on screen display) signal generated from an OSD signal generating unit 59 with the digital video signal supplied from the signal processing unit 48. The graphic processing unit 56 can selectively output the output video signal of the signal processing unit 48 and the output OSD signal of the OSD signal generating unit 59, and both outputs may be combined to constitute a half of each picture.

The digital video signal output from the graphic processing unit 56 is supplied to a video processing unit 60. The video processing unit 60 converts the input digital video signal into an analog video signal based on a format that can be displayed by the video display 14. The video processing unit 60 outputs the converted signal to the video display 14 to be displayed, and leads the signal to the outside through an output terminal 61.

The audio processing unit 57 performs an audio quality correcting process or the like on the input digital audio signal, and converts the digital audio signal into an analog audio signal based on a format that can be reproduced by the speaker 15. The analog audio signal is output to the speaker 15 and provided for sound reproduction. The audio signal is led to the outside through an output terminal 62.

In the digital television broadcasting receiver 11, all operations including various reception operations described above are generally controlled by a control unit 63. The control unit 63 having a CPU (central processing unit) 64 therein receives operation information output from the operation unit 16 or operation information received by the light reception unit 18 transmitted from the remote controller 17, and controls each unit on the basis of the operation information.

In this case, the control unit 63 mainly uses a ROM (read only memory) 65 for storing a control program performed by the CPU 64, a RAM (random access memory) 66 providing a work area for the CPU 64, and a non-volatile memory 67 for storing various kinds of setting information and control information.

The control unit 63 is connected to a card holder 69 for holding the first memory card 19 through a card I/F (interface) 68. Accordingly, the control unit 63 can communicate information with the first memory card 19 held by the card holder 69 through the card I/F 68.

The control unit 63 is connected to a card holder 71 for holding the second memory card 20 through a card I/F 70. Accordingly, the control unit 63 can communicate information with the second memory card 20 held by the card holler 71 through the card I/F 70.

The control unit 63 is connected to the first LAN terminal 21 through a communication I/F 72. Accordingly, the control unit 63 can communicate information with the LAN corresponding HDD 25 connected to the first LAN terminal 21 through the communication I/F 72. In this case, the control unit 63 having a DHCP (dynamic host configuration protocol) server function assigns an IP (internet protocol) address to the LAN corresponding HDD 25 connected to the first LAN terminal 21.

The control unit 63 is connected to the second LAN terminal 22 through a communication I/F 73. Accordingly, the control unit 63 can communicate information with devices (see FIG. 1) connected to the second LAN terminal 22 through the communication I/F 73.

The control unit 63 is connected to the USB terminal 23 through a USB I/F 74. Accordingly the control unit 63 can communicate information with devices (see FIG. 1) connected to the USB terminal 23 through the USB I/F 74.

The control unit 63 is connected to the IEEE 1394 terminal 24 through an IEEE 1394 I/F 75. Accordingly, the control unit 63 can communicate information with devices (see FIG. 1) connected to the IEEE 1394 terminal 24 through the IEEE 1394 I/F 75.

Figure 3:
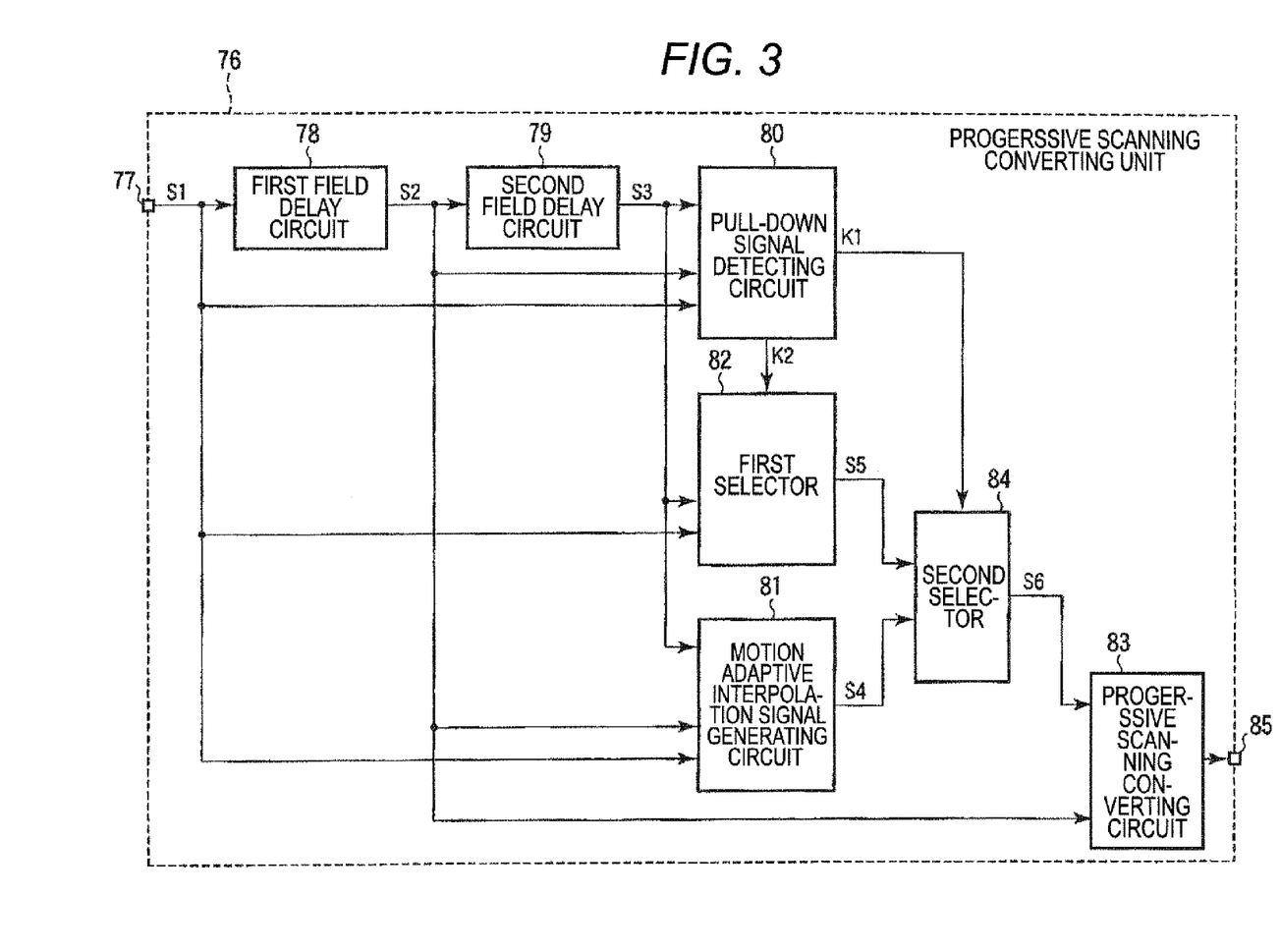
FIG. 3 is an exemplary block diagram illustrating a progressive scanning converting unit included in a signal processing unit of the digital television broadcasting receiver according to the embodiment.

FIG. 3 shows a progressive scanning converting unit 76 provided in the signal processing unit 48 to convert an interlaced scanning video signal into a progressive scanning video signal. In the progressive scanning converting unit 76, a present field signal S1 that is an interlaced scanning input video signal supplied to an input terminal 77 is supplied to a first field delay circuit 78, and is read out as a 1-field delay signal S2 after one field.

The first field delay circuit 78 has, for example, two memory areas of one field, and an input video signal of one field is alternately recorded in the two memory areas. The recorded video signal is alternately read out from the two memory areas.

For this reason, when the present field signal S1 recorded in one memory area of the first field delay circuit 78 is read out as the 1-field delay signal S2 from the first field delay circuit 78, simultaneously, the next present field signal S1 is recorded in the other memory area of the first field delay circuit 78.

The 1-field delay signal 52 read out from the 1-field delay circuit 78 is supplied to a second field delay circuit 79, and is read out as a 2-field delay signal S3 after one field. The second field delay circuit 79 has the same configuration and operation as the first field delay circuit 78.

The present field signal S1, the 1-field delay signal S2, and the 2-field delay signal S3 are supplied to a pull-down signal detecting circuit 80 and a motion adaptive interpolation signal generating circuit 81. The present field signal S1 and the 2-field delay signal S3 are supplied to a first selector 82. The 1-field delay signal S2 is supplied to a progressive scanning converting circuit 83.

The motion adaptive interpolation signal generating circuit 81 generates a motion adaptive interpolation signal S4 positioned between the lines of the 1-field delay signal 2 by a motion correction interpolation process using, for example, a motion vector, on the basis of the input present field signal S1, 1-field delay signal S2, and 2-field delay signal S3, and the motion adaptive interpolation signal generating circuit 81 outputs the motion adaptive interpolation signal S4 to a second selector 84.

The pull-down signal detecting circuit 80 detects whether or not the video signal supplied to the input terminal 77 is a pull-down signal on the basis of the input present field signal S1, 1-field delay signal S2, and 2-field delay signal S3, and the pull-down signal detecting circuit 80 generates and outputs a pull-down signal detection signal K1 representing the detection result and a pair field selection signal K2.

The pair field selection signal K2 is supplied to the first selector 82. The first selector 82 selects any one of the present field signal S1 and the 2-field delay signal S3 as a field that is a pair with the 1-field delay signal S2, on the basis of the input pair field selection signal K2, and outputs the selected signal as a pair field signal S5 to the second selector 84.

When it is represented that the pull-down signal detection signal K1 output from the pull-down signal detecting circuit 80 is a pull-down signal, the second selector 84 selects the pair field signal S5 output from the first selector 82. Otherwise, the second selector 84 selects the motion adaptive interpolation signal S4 output from the motion adaptive interpolation signal generating circuit 81. The selected signal is output as an interpolation signal S6 to the progressive scanning converting circuit 83.

The progressive scanning converting circuit 83 generates a progressive scanning video signal by arranging (synthesizing) the interpolation signal S6 output from the second selector 84 and the 1-field delay signal S2 that is a direct signal, in order of progressive scanning. The progressive scanning video signal is output from an output terminal 85 and is provided for video display.

That is, in the progressive scanning converting unit 76, when the input video signal is a pull-down signal, a progressive scanning converting process is performed on the pair field signal S5 as the interpolation signal S6. When the input video signal is not a pull-down signal, a progressive scanning converting process is performed on the motion adaptive interpolation signal S4 as the interpolation signal S6. As described above, it is possible to improve video quality by changing the method of the conversion process to the progressive scanning method according to whether or not the input video signal is a pull-down signal.

Figure 4:
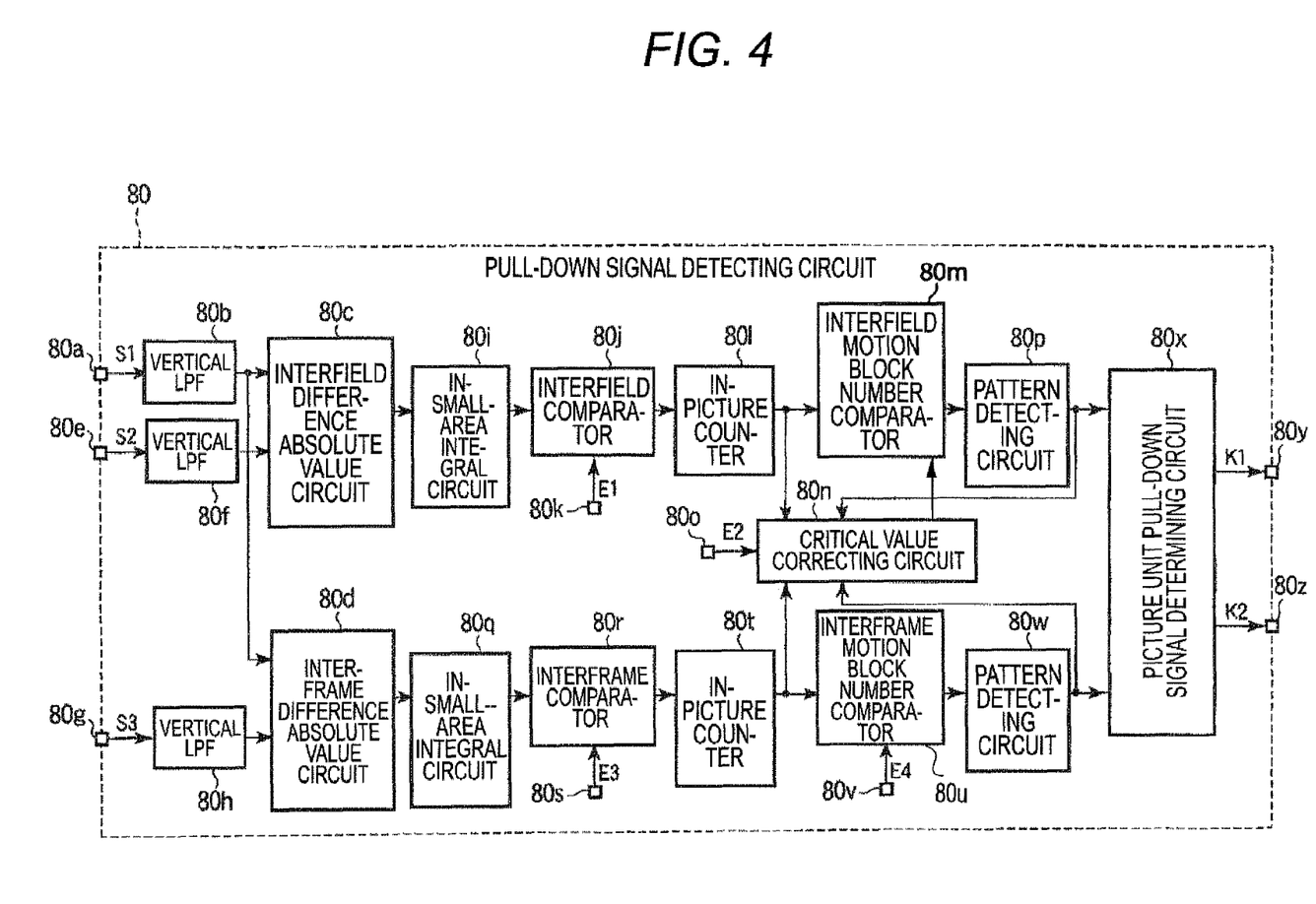
FIG. 4 is an exemplary block diagram illustrating a pull-down signal detecting circuit included in the progressive scanning converting unit according to the embodiment.

FIG. 4 shows the pull-down signal detecting circuit 80 in detail. In the pull-down signal detecting circuit 80, the present field signal S1 supplied to an input terminal 80*a* passes through a vertical LPF (low filter) 80*b*, and then is supplied to an interfield difference absolute value circuit 80*c* and an interframe difference absolute value circuit 80*d*.

The 1-field delay signal S2 supplied to the input terminal 80*e* passes through a vertical LPF 80*f*, and then is supplied to the interfield difference absolute value circuit 80*c*. The 2-field delay signal S3 supplied to the input terminal 80*g* passes through a vertical LPF 80*h*, and then is supplied to the interframe difference absolute value circuit 80*d*.

The interfield difference absolute circuit 80*c* calculates an absolute value of difference between the input present field signal S1 and the 1-field delay signal S2. The absolute value of difference is used to obtain interfield relation between the present field signal S1 and the 1-field delay signal S2, and is supplied to an in-small-area integral circuit 80*i*.

The in-small-area integral circuit 80*i* generates an interfield difference value of a small area unit by integrating the input absolute value of the interfield difference by a small area formed of a plurality of pixels obtained by departmentalizing a field, for example, a block unit having a rectangular shape formed of horizontal 8 pixels×vertical 8 pixels, and outputs the interfield difference value of the small area unit to an interfield comparator 80*j*.

The interfield comparator 80*j* compares the interfield difference value of the small area unit supplied from the in-small-area integral circuit 80*i* with a threshold level E1 preset in a setting terminal 80*k*, thereby determining whether or not each small area is a motion picture. Every when it is determined that the small area is a motion picture, the interfield comparator 803 outputs a motion picture determination signal to an in-picture counter 801.

The in-picture counter 801 counts the motion picture determination signal supplied from the interfield comparator 80*j* to calculate the number of small areas determined as an interfield motion picture, that is, an interfield motion block number, and outputs the interfield motion block number to an interfield motion block number comparator 80*m* and a threshold level correcting circuit 80*n*.

In this case, the threshold level correcting circuit 80*n* outputs a threshold level E2 preset in a setting terminal 80*o* to the interfield motion block number comparator 80*m*. The interfield motion block number comparator 80*m* compares the interfield motion block number supplied from the in-picture counter 801 with the threshold level E2, thereby performing interfield motion determination, and outputs the determination result to a pattern detecting circuit 80*p*.

The interframe difference absolute value circuit 80*d* calculates an absolute value of difference between the input present field signal S1 and 2-field delay signal S3. The absolute value of the difference is used to obtain interrelation between the present field signal S1 and the 2-field delay signal S3, that is, interframe relation, and is supplied to an in-small-area integral circuit 80*q*.

The in-small-area integral circuit 80*q* generates an interframe difference value of a small area unit by integrating the absolute value of the interframe difference by a small area formed of a plurality of pixels obtained by departmentalizing a frame, for example, a block unit having a rectangular shape formed of horizontal 8 pixels×vertical 8 pixels, and outputs the interframe difference value of the small area unit to an interframe comparator 80*r*.

The interframe comparator 80*r* compares the interframe difference value of the small area unit supplied from the in-small-area integral circuit 80*q* with a threshold level E3 preset in a setting terminal 80*s*, thereby determining whether or not each small area is a motion picture. Even when it is determined that the small area is a motion picture, the interframe comparator 80*r* outputs a motion picture determination signal to an in-picture counter 80*t*.

The in-picture counter 80*t* counts the motion picture determination signal supplied from the interframe comparator 80*r* to calculate the number of small areas determined as an interframe motion picture, that is, an interframe motion block number, and outputs the interframe motion block number to an interframe motion block number comparator 80*u* and the threshold level correcting circuit 80*n*.

The interframe motion block number comparator 80*u* compares the interframe motion block number supplied from the in-picture counter 80*t* with the threshold level E4 preset in a setting terminal 80*v*, thereby performing interframe motion determination, and outputs the determination result to a pattern detecting circuit 80*w*.

Figure 5A:
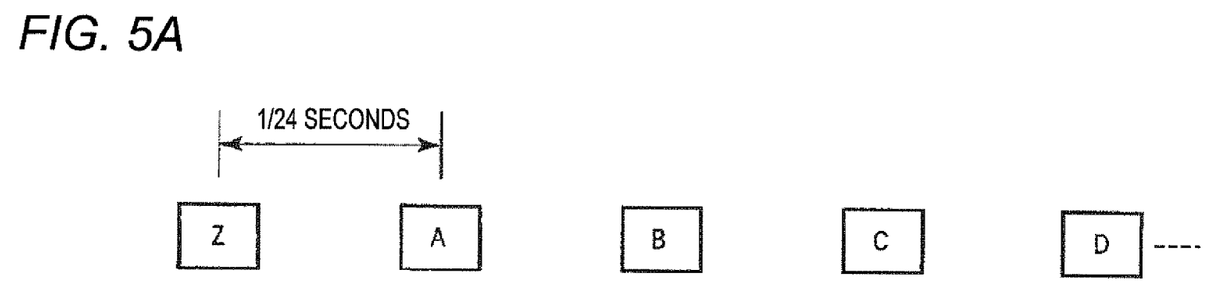
FIGS. 5A and 5B are exemplary diagrams illustrating patterns of interfield and interframe motion determination results of a 2-3 pull-down signal according to the embodiment.
Figure 5B:
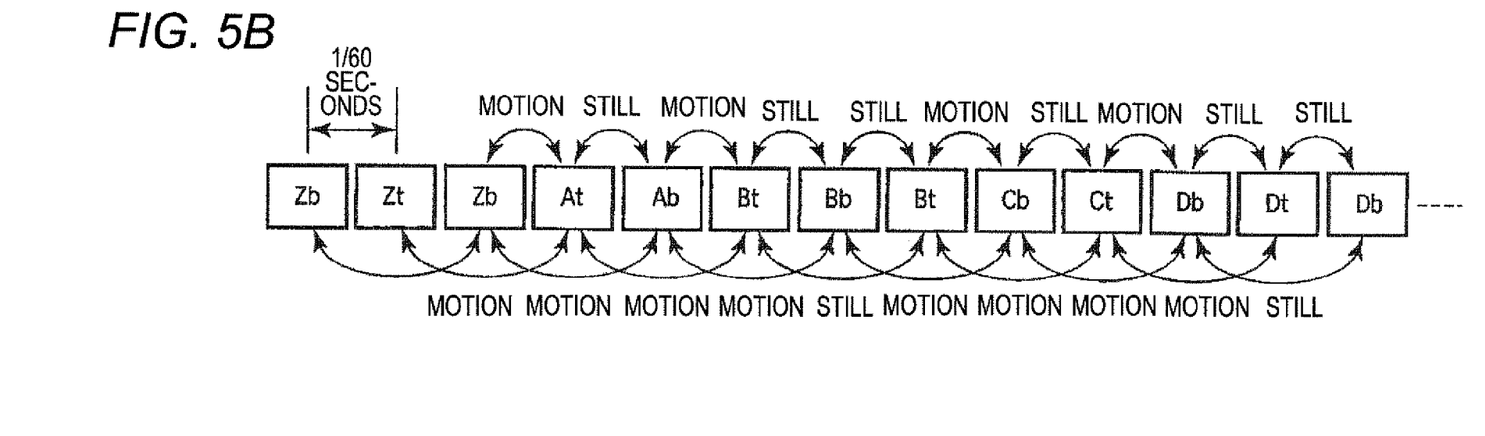

FIG. 5A shows frames Z, A, B, C, D, . . . of a cine film obtained continuously, and FIG. 5B shows an example of converting a picture of the frames Z, A, B, C, D, . . . of the cine film into an interlaced scanning video signal by using a 2-3 pull-down method.

Paying attention to the frame A, the picture of the frame A is divided into two fields of a top field At and a bottom field Ab, and the picture of the next frame B is divided into three fields of a top field Bt, a bottom field Bb, and a top field Bt.

That is, the plurality of frames of the cine film obtained continuously are alternately divided into two fields and three fields, so that the top field and the bottom field alternately appear.

In such a 2-3 pull-down signal, the interfield motion determination is as follows. Since the frames are different from each other between the top field At and the former bottom field Zb, it is motion determination. Since the frames are equal to each other between the top field At and the later bottom field Ab, it is still determination. Since the frames are different from each other between the bottom field Ab and the later top field Bt, it is motion determination. Since the frames are equal to each other between the top field Bt and the later bottom field Bb, it is still determination. Since the frames are equal to each other between the bottom field Bt and the later top field Bb, it is still determination. Hereinafter, the five kinds of determination results are repeated.

That is, in the 2-3 pull-down signal, the interfield motion determination result is a pattern repeated in order of "motion", "still", "motion", "still", "still". For this reason, when the interfield motion determination result determined by the interfield motion block number comparator 80m coincides with the pattern, the pattern detecting circuit 80p outputs the determination result that the input video signal is a pull-down signal to the threshold level correcting circuit 80n and a picture unit pull-down signal determining circuit 80x.

In the 2-3 pull-down signal, the interframe motion determination is as follows. Since the frames are different from each other between the top field At and the top field Zt before two fields, it is motion determination. Since the frames are different from each other between the bottom field Ab after the top field At and the bottom field Zb before two fields, it is motion determination. Since the frames are different from each other between the top field Bt after the bottom field Ab and the top field At before two fields, it is motion determination. Since the frames are different from each other between the bottom field Bb after the top field St and the bottom field Ab before two fields, it is motion determination. Since the frames are equal to each other between the top field St after the bottom field Bb and the top field Bt before two fields, it is still determination. Hereinafter, the five kinds of determination results are repeated.

That is, in the 2-3 pull-down signal, the interframe motion determination result is a pattern repeated in order of "motion", "motion", "motion", "motion", "still". For this reason, when the interframe motion determination result determined by the interframe motion block number comparator 80u coincides with the pattern, the pattern detecting circuit 80w outputs the determination result that the input video signal is a pull-down signal to the threshold level correcting circuit 80n and the picture unit pull-down signal determining circuit 80x.

When the determination result that the input video signal is a pull-down signal is obtained from the two pattern detecting circuit 80p and 80w, the picture unit pull-down signal determining circuit 80x determines that the input video signal is a pull-down signal. The picture unit pull-down signal determining circuit 80x outputs the pull-down signal detection signal K1 to the second selector 84 through an output terminal 80y, and outputs the pair field section signal K2 to the first selector 82 through an output terminal 80z.

Figure 6:
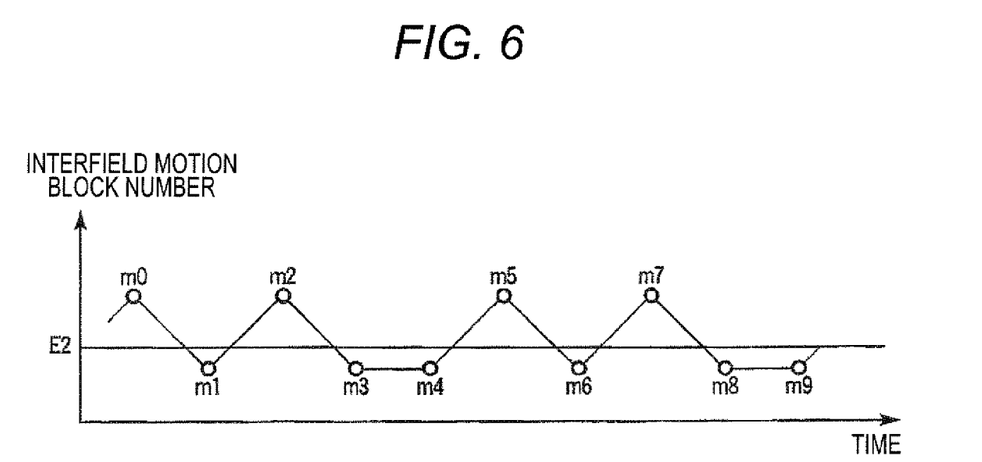
FIG. 6 is an exemplary diagram illustrating an interfield motion determination operation by an interfield motion block number comparator of the pull-down signal detecting circuit according to the embodiment.

FIG. 6 shows the interfield motion determining operation of the interfield motion block number comparator 80m. That is, the interfield motion block number comparator 80m compares the interfield motion block numbers m0 to m9 supplied from the in-picture counter 801 with the threshold level E2. When the interfield motion block numbers m0 to m9 are larger than the threshold level E2, the interfield motion determination result is motion determination.

In FIG. 6, the interfield motion block numbers m0, m1, m2, m3, and m4 are determined as "motion", "still", "motion", "still", and "still", respectively, and are configured in a pattern of repeating the determination results in the order. Accordingly, the interfield motion block number comparator 80m determines that the input video signal is a pull-down signal.

Figure 7:
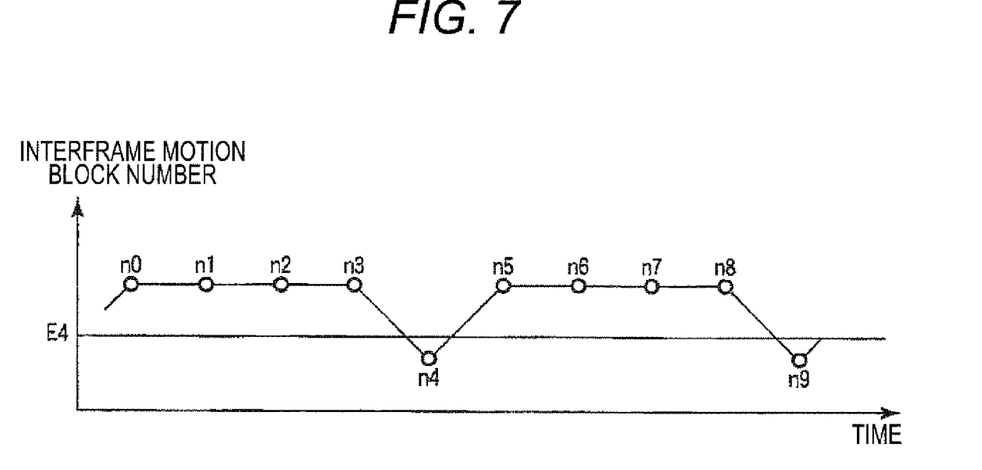
FIG. 7 is an exemplary diagram illustrating an interframe motion determination operation by an interframe motion block number comparator of the pull-down signal detecting circuit according to the embodiment.

FIG. 7 shows the interframe motion determining operation of the interframe motion block number comparator 80u. That is, the interframe motion block number comparator 80u compares the interframe motion block numbers n0 to n9 supplied from the in-picture counter 80t with the threshold level E4. When the interframe motion block numbers n0 to n9 are larger than the threshold level E4, the interframe motion determination result is motion determination.

In FIG. 7, the interframe motion block numbers n0, n1, n2, n3, and n4 are determined as "motion", "motion", "motion", "motion", and "still", respectively, and are configured in a pattern of repeating the determination results in the order. Accordingly, the interframe motion block number comparator 80u determines that the input video signal is a pull-down signal.

However, when the input video signal is based on an interlaced scanning method (interlaced signal), a shift occurs in vertical phase in the top field and the bottom field. For this reason, even in the case of perfectly still scene, delicate difference occurs between the top field and the bottom field.

Figure 8A:
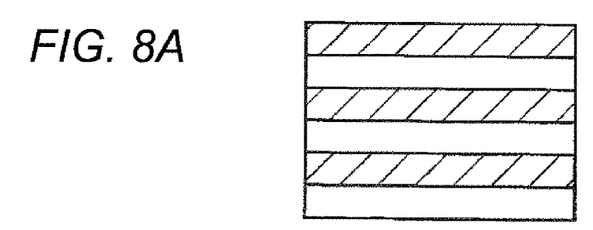
FIGS. 8A to 8C are exemplary diagrams illustrating that differences between a top field and a bottom field after pull-down gets larger as a picture includes a larger amount of vertical high frequency components.
Figure 8B:
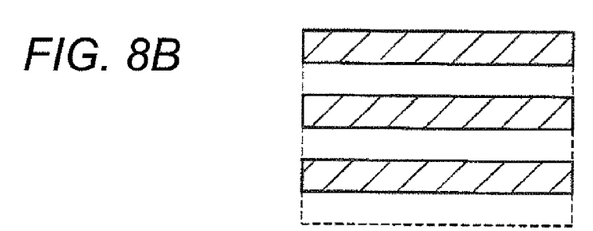
Figure 8C:
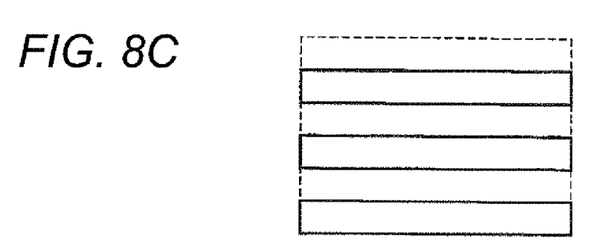

For example, as one frame of a cine film shown in FIG. 8A, in a picture including a larger amount of high frequency components (hereinafter, referred to as vertical high frequency component) in a vertical direction, brightness in the top field after pull-down is low (or high) as shown in FIG. 8B and brightness in the bottom field is high (or low) as shown in FIG. 8C.

For this reason, the difference between the top field and the bottom field gets larger, and the effect thereof is remarkably represented. That is, when the motion determination is performed from the largeness and smallness of the interfield difference value to perform the interfield motion determination, a difference occurs between the fields by the shift in vertical phase between the fields as described above. Accordingly, the motion determination may not be properly performed.

Figure 9:
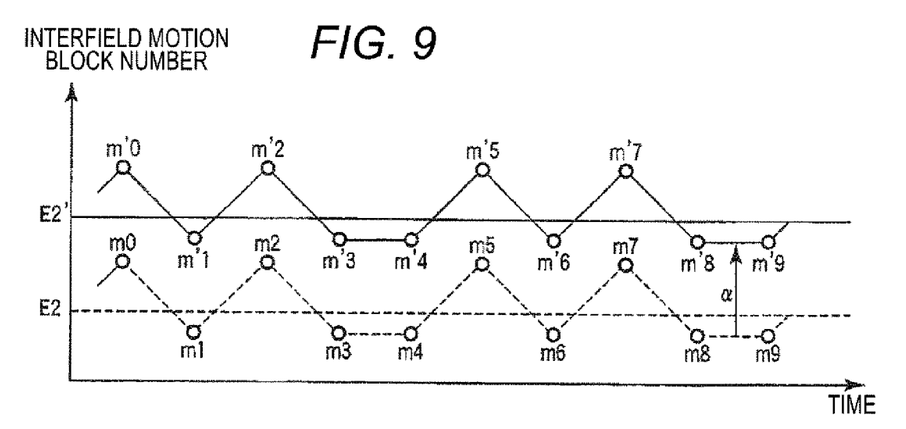
FIG. 9 is an exemplary diagram illustrating change of a threshold level for determining interfield motion by a threshold level correcting circuit of the pull-down signal detecting circuit according to the invention.

That is, in the scene with a large amount of vertical high frequency components, as show in FIG. 9 by solid lines, even in the case of a still scene, the interfield motion block numbers m'0, m'1, m'2, . . . are estimated larger than the original values m0, m1, m2, . . . represented by dotted lines as much as a difference value a caused by the vertical high frequency component and thus are over the threshold level E2. Accordingly, false determination that is motion determination is always performed between the fields.

In this case, even when it is determined that the video signal is a pull-down signal by the interframe motion determination, the interfield motion determination result does not coincide with the pull-down pattern. Finally, the video signal is not determined as a pull-down signal.

However, when a scene including the vertical high frequency component is a pull-down signal, there is a difference value caused by a motion component between the interfield motion block numbers m'0, m'2, m'5, . . . to be determined as motion and the interfield motion block numbers m'1, m'3, m'4, ... to be determined as still.

In the embodiment, the threshold level correcting circuit 80n is provided. Accordingly, when the interframe motion determination result is a pull-down signal, the threshold level E2 of the interfield motion determination is changed to the other threshold level E2' as the interfield difference caused by the shift in interfield vertical phase is corrected. Therefore, it is possible to perform a pull-down detection removing the effect of the vertical high frequency component.

Hereinafter, various examples of changing the threshold level E2 for the interfield motion determination performed by the threshold level correcting circuit 80n will be described.

(1) First, in FIG. 9, since it is considered that the interfield motion block numbers m'1, m'3, m'4, ... to be determined as still is over the threshold level E2 due to the interfield vertical high frequency component, a value obtained by adding a value obtained by multiplying a predetermined coefficient k by an average value of one or more fields of the interfield motion block numbers m'1, m'3, m'4, ... , to the threshold level E2 is a new threshold level E2'. That is, $$E2'=E2+k\times(m'1+m'3+m'4+\ldots)/\text{average field number.}$$

(2) In the pull-down pattern, the interfield motion block numbers m'0, m'2, m'5, ... , from which the interfield motion determination result to coincide with the original interframe motion determination result is obtained, are that the 1-field delay signal S2 and the 2-field delay signal S3 compared with the present field signal S1 are created from the same frame the cine film.

For example, in FIG. 5B, assuming that the present field signal S1 is the bottom frame Cb, the 1-field delay signal S2 compared with the bottom frame Cb is the top field Bt and the 2-field delay signal S3 is the bottom field Bb. Both of Bt and Bb are fields created from the same frame B of the cine film.

For this reason, it is considered that difference values (m'0-n0), (m'2-n2), (m'5-n5), ... between the interframe motion block numbers n0, n2, n5, ... and the interfield motion block numbers m'0, m'2, m'5, ... , to be determined to be the same determination result each other, are caused by the interfield vertical high frequency components.

Accordingly, a value obtained by adding a value obtained by multiplying a predetermined coefficient k by an average value of one or more fields of the difference values (m'0-n0), (m'2-n2), (m'5-n5), to the threshold level E2 is a new threshold level E2'. That is, $$E2'=E2\times\{(m'0-n0)+(m'2-n2)+\ldots\}/\text{average field number.}$$

The new threshold level E2' generated by the above (1) and (2) is calculated by adding a correction value H calculated using the interfield motion block number or the interframe motion block number, to the threshold level E2 compared with the interfield motion block number. That is, $$E2'=E2+H.$$

(3) In FIG. 9, a value obtained by multiplying a predetermined coefficient k by an average value of a maximum value Max (m'0, m'2, m'5, ... ) of the motion block numbers of at least one field of the interfield motion block numbers m'0, m'2, m'5, ... to be determined as motion and a minimum value Min (m'1, m'3, m'4, ... ) of the motion block numbers of at least one field of the interfield motion block numbers m'1, m'3, m'4, ... to be determined as still is a new threshold level E2'. That is, $$E2'=k\times\{\text{Max}(m'0,m'2,\ldots)+\text{Min}(m'1,m'3,\ldots)\}/2.$$

(4) In FIG. 9, a value obtained by multiplying a predetermined coefficient k by an average value of a minimum value Min (m'0, m'2, m'5, ... ) of the motion block numbers of at least one field of the interfield motion block numbers m'0, m'2, m'5, ... to be determined as motion and a maximum value Max (m'1, m'3, m'4, ... ) of the motion block numbers of at least one field of the interfield motion block numbers m'1, m'3, m'4, ... to be determined as still is a new threshold level E2'. That is, $$E2'=k\times\{\text{Min}(m'0,m'2,\ldots)+\text{Max}(m'1,m'3,\ldots)\}/2.$$

(5) In FIG. 9, a value obtained by multiplying a predetermined coefficient k by an average value of an average value Avr (m'0, m'2, m'5, ... ) of the motion block numbers of at least one field of the interfield motion block numbers m'0, m'2, m'5, ... to be determined as motion and an average value Avr (m'1, m'3, m'4, ... ) of the motion block numbers of at least one field of the interfield motion block numbers m'1, m'3, m'4, ... to be determined as still is a new threshold level E2'. That is, $$E2'=k\times\{\text{Avr}(m'0,m'2,\ldots)+\text{Avr}(m'1,m'3,\ldots)\}/2.$$

That is, according to the invention, when the interframe motion determination result represents a pull-down signal and the interfield motion determination result does not represent a pull-down signal by the large vertical high frequency component in the picture, the threshold level E2 for performing the interfield motion determination is changed to the other threshold level E2' as the interfield difference caused by the shift in interfield vertical phase is corrected. Accordingly, it is possible to accurately perform the interfield motion determination removing the effect of the vertical high frequency component, and thus it is possible to perform a pull-down detection with high precision.

Figure 10:
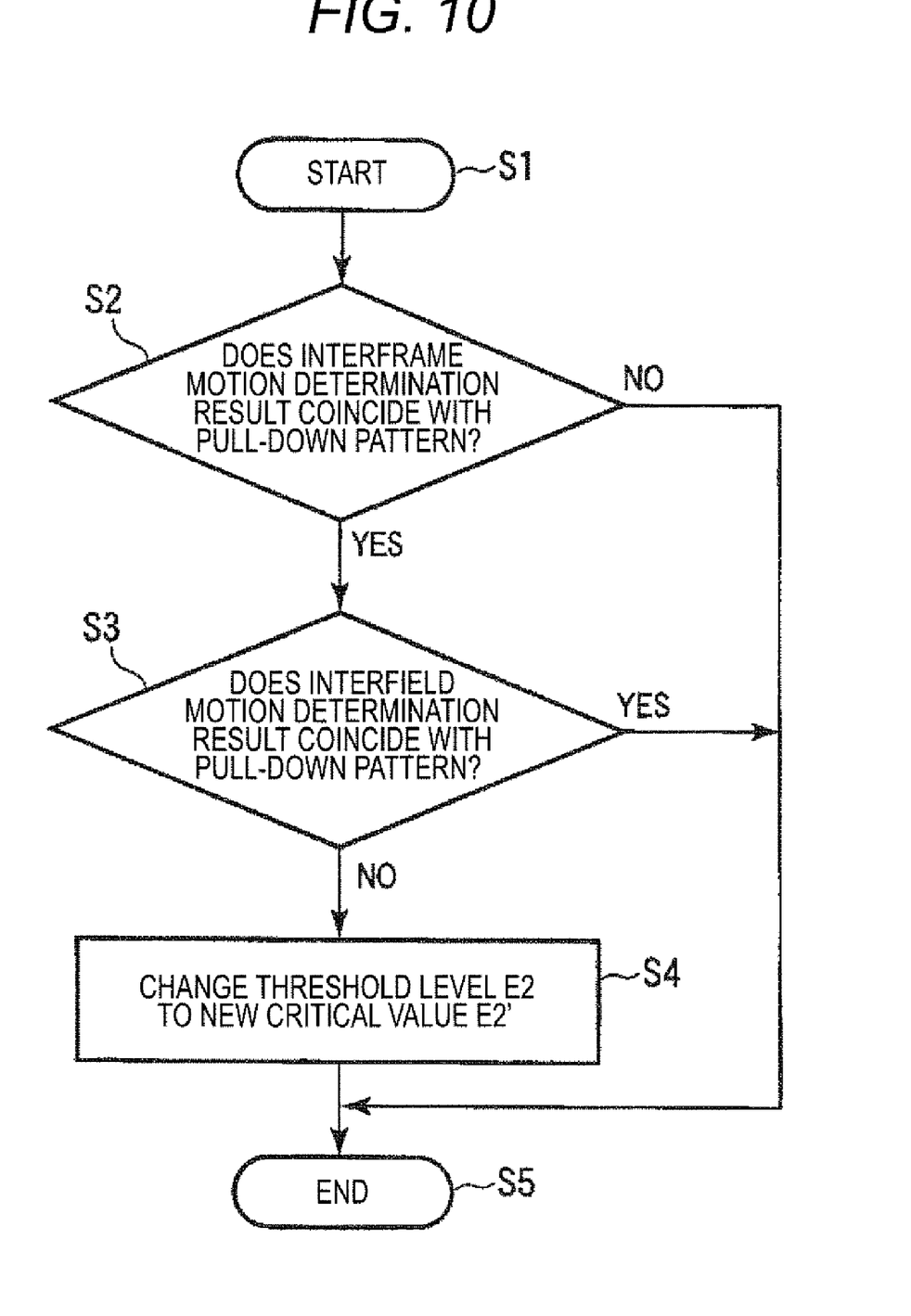
FIG. 10 is an exemplary flowchart illustrating process operations performed by the threshold level correcting circuit according to the embodiment.

FIG. 10 shows a flowchart of process operations performed by the threshold level correcting circuit 80n. That is, when the process is started (Step S1), the threshold level correcting circuit 80n determines whether or not the interframe motion determination result coincide with the pull-down pattern on the basis of the detection result of the pattern detecting circuit 80w in Step S2.

When it is determined that the interframe motion determination result coincides with the pull-down pattern (YES), the threshold level correcting circuit 80n determines whether or not the interfield motion determination result coincides with the pull-down pattern on the basis of the detection result of the pattern detecting circuit 80p in Step S3.

When it is determined that the interframe motion determination result does not coincide with the pull-down pattern in Step S2 (NO), or when the interfield motion determination result coincides with the pull-down pattern in Step S3 (YES), the threshold level correcting circuit 80n outputs the threshold level E2 and the process is ended (Step s5).

When the interfield motion determination result does not coincide with the pull-down pattern in Step S3 (NO), the threshold level correcting circuit 80n generates the new threshold level E2' using any one method of the above (1) to (5) in Step S4, and the process is ended (Step S5).

In the embodiment, the detection of the 2-3 pull-down signal has been mainly described, but there are particular pull-down patterns in the interframe motion determination result and the interfield motion determination result, for a 2-2 pull-down pattern. For this reason, when the threshold level E2 for the interfield motion determination is changed on the basis of the detection result of the pull-down pattern, it is possible to accurately detect a pull-down signal.

The invention is not limited to the above-described embodiment, and may be variously modified within the scope of the concept of the invention by changing the constituent elements. In addition, it is possible to make various inventions by combining the constituent elements disclosed in the embodiment. For example, some constituent elements may be eliminated from the whole constituent elements described in the embodiment. The constituent elements according to difference embodiments may be appropriately combined.

As described with reference to the embodiment, there is provided a pull-down signal detecting device, a pull-down signal detecting method, and a progressive scanning converting device, which are sufficiently suitable for practical use and are capable of detecting whether or not an input video signal is a pull-down signal with high precision, and further improving video quality by applying them to a progressive scanning converting process or the like.

According to the invention, when the interframe motion determination result coincides with the pull-down pattern and the interfield motion determination result does not coincide with the pull-down pattern, the threshold level of the interfield motion determination is changed. Therefore, it is possible to detect whether or not the input video signal is the pull-down signal with high precision, and further to improve video quality by applying the invention to a progressive scanning converting process or the like, and thus the invention is sufficiently suitable for practical use.

What is claimed is:

1. A pull-down signal detecting apparatus comprising:
   an interfield motion detecting module that determines whether or not an input image is a moving image by comparing a present field signal of an input video signal with a 1-field delay signal thereof by a block unit formed of small areas, and performs interfield motion determination by comparing an interfield motion block number determined as the moving image with a reference threshold value;
   an interframe motion determining module that determines whether or not the input image is a moving image by comparing the present field signal of the input video signal with a 2-field delay signal thereof by a block unit formed of small areas, and performs interframe motion determination by comparing an interframe motion block number determined as the moving image with a reference threshold value;
   a determination module that determines that the input video signal is a pull-down signal when the determination result of the interfield motion determining module and the determination result of the interframe motion determining module both coincide with a pull-down pattern; and
   a threshold value correcting module that changes the reference threshold value of the interfield motion determining module to correct interfield difference caused by shift of interfield vertical phase, when the determination result of the interframe motion determining module coincides with the pull-down pattern while the determination result of the interfield motion determining module does not coincide with the pull-down pattern.

2. The pull-down signal detecting apparatus of claim 1, wherein the threshold value correcting module corrects the reference threshold value as much as the interfield motion block number is largely estimated, based on the interfield difference generated by a vertical high frequency component.

3. The pull-down signal detecting apparatus of claim 1, wherein the threshold value correcting module sets, as a threshold value after change, a value obtained by adding a value obtained by multiplying a predetermined coefficient by an average value of at least one field of the interfield motion block number to be determined as still on the pull-down pattern, to the reference threshold value.

4. The pull-down signal detecting apparatus of claim 1, wherein when the present field signal is compared with each of the 1-flied delay signal and the 2-field delay signal generated from a picture of the same coma, the threshold value correcting module sets, as a threshold value after change, a value obtained by adding a value obtained by multiplying a predetermined coefficient by an average value of at least one field of difference between the interfield motion block number and the interframe motion block number, to the reference threshold value.

5. The pull-down signal detecting apparatus of claim 1, wherein the threshold value correcting module sets, as a threshold value after change, a value obtained by multiplying a predetermined coefficient by an average value of a maximum value of at least on field of the interfield motion block number to be determined as motion on the pull-down pattern and a minimum value of at least one field of the interfield motion block number to be determined as still.

6. The pull-down signal detecting apparatus of claim 1, wherein the threshold value correcting module sets, as a threshold value after change, a value obtained by multiplying a predetermined coefficient by an average value of a minimum value of at least on field of the interfield motion block number to be determined as motion on the pull-down pattern and a maximum value of at least one field of the interfield motion block number to be determined as still.

7. The pull-down signal detecting apparatus of claim 1, wherein the threshold value correcting module sets, as a threshold value after change, a value obtained by multiplying a predetermined coefficient by an average value of an average value of at least on field of the interfield motion block number to be determined as motion on the pull-down pattern and an average value of at least one field of the interfield motion block number to be determined as still.

8. A pull-down signal detecting method comprising:
   determining whether or not an input image is a moving image by comparing a present field signal of an input video signal with a 1-field delay signal thereof by a block unit formed of small areas, and performing interfield motion determination by comparing an interfield motion block number determined as the moving image with a reference threshold value;
   determining whether or not the input image is a moving image by comparing the present field signal of the input video signal with a 2-field delay signal thereof by a block unit formed of small areas, and performing interframe motion determination by comparing an interframe motion block number determined as the moving image with a reference threshold value;
   determining that the input video signal is a pull-down signal when the determination result of the interfield motion determining module and the determination result of the interframe motion determining module both coincide with a pull-down pattern; and
   changing the reference threshold value of the interfield motion determining module to correct interfield difference caused by shift of interfield vertical phase, when the determination result of the interframe motion determining module coincides with the pull-down pattern and when the determination result of the interfield motion determining module does not coincide with the pull-down pattern.

9. A sequential scanning convening apparatus comprising:

an interfield motion detecting module that determines whether or not an input image is a moving image by comparing a present field signal of an input video signal with a 1-field delay signal thereof by a block unit formed of small areas, and performs interfield motion determination by comparing an interfield motion block number determined as the moving image with a reference threshold value;

an interframe motion determining module that determines whether or not the input image is a moving image by comparing the present field signal of the input video signal with a 2-field delay signal thereof by a block unit formed of small areas, and performs interframe motion determination by comparing an interframe motion block number determined as the moving image with a reference threshold value;

a determination module that determines that the input video signal is a pull-down signal when the determination result of the interfield motion determining module and the determination result of the interframe motion determining module both coincide with a pull-down pattern;

a threshold value correcting module that changes the reference threshold value of the interfield motion determining module to correct interfield difference caused by shift of interfield vertical phase, when the determination result of the interframe motion determining module coincides with the pull-down pattern while the determination result of the interfield motion determining module does not coincide with the pull-down pattern;

an interpolation signal generating module that generates a motion adaptive interpolation signal based on the present field signal, the 1-field delay signal, and the 2-field delay signal of the input video signal;

a first selection module that selectively outputs the present field signal and the 2-field delay signal based on the determination result of the determination module;

a second selection module that selects the output of the first selection module based on the determination result of the determination module when the determination module determines that the input video signal is a pull-down signal, and selects the motion adaptive interpolation signal generated by the interpolation signal generating module based on the determination result when the determination module determines that the input video signal is not a pull-down signal; and a sequential scanning converting module that generates a sequential scanning video signal by arranging the output of the second selection module and the 1-field delay signal.

* * * * *